June 10, 1969 B. J. WARMAN ETAL 3,449,521

AUTOMATIC TELEPHONE EXCHANGE SWITCHING SYSTEMS

Filed March 4, 1965

United States Patent Office 3,449,521
Patented June 10, 1969

3,449,521

AUTOMATIC TELEPHONE EXCHANGE SWITCHING SYSTEMS

Bloomfield James Warman, London, Donald Keith Hicks, Hawley, near Dartford, Kent, and Alan James Barned, Sidcup, Kent, England, assignors to Associated Electrical Industries Limited, London, England, a British company Filed Mar. 4, 1965, Ser. No. 437,153
Claims priority, application Great Britain, Mar. 11, 1964, 10,296/64
Int. Cl. H04m 3/00
U.S. Cl. 179—16 5 Claims

ABSTRACT OF THE DISCLOSURE

An automatic telephone exchange switching system employing both step-by-step and co-ordinate switching equipment of the reed-relay cross-point type wherein certain of the exchange lines are served by the co-ordinate switches which have access to and are accessible from selector switches of the step-by-step equipment.

This invention relates to automatic telephone exchange switching systems, and is specifically concerned with such switching systems employing switching equipment of the so-called step-by-step type.

The ultimate line capacity of automatic telephone exchanges is dependent upon the floor space available, in exchange buildings, for line switching and associated equipment. Consequently, in designing and constructing automatic telephone exchanges, it is necessary to take into account the expected growth of telephone traffic over an extended period in the areas to be served by such exchanges. However, in certain instances the expected rate of growth of telephone traffic or the expected ultimate demand for telephone lines can be exceeded due to unforeseeable factors, as for example, the sudden large scale development or expansion of industries and/or residential estates in areas which were expected to develop more slowly, with the result that the line capacity of existing exchanges serving such areas may be completely inadequate to meet the demand for additional lines. The need for providing additional lines may also arise at the time when existing switching equipment is fully equipped step-by-step system exchanges is nearing the end of its useful life.

The present invention has in view measures for meeting such demands for additional lines, made upon a step-by-step system exchange, without the need for providing additional floor space in the exchange building, as by extending the existing building or by building a fresh one. These measures include the introduction of co-ordinate switching equipment which may be so-called cross-bar or cross-point equipment into an existing exchange either in addition to (i.e. for exchange extension), or in substitution for (i.e. for exchange conversion), the step-by-step switching equipment. By the substitution of co-ordinate switching equipment for step-by-step switching equipment, economies in floor space, which in effect increase the potential line capacity of the exchange, can be achieved by reason of the compactness and relatively small size of the co-ordinate equipment, while the addition of co-ordinate equipment, instead of corresponding more bulky step-by-step switching equipment, to a step-by-step system exchange to provide for serving additional lines, enables existing floor space to be utilised more efficiently, so that once again the potential line capacity of the exchange is effectively increased. It is also contemplated that other advantages in the form of additional and/or improved service facilities to subscribers may ensue from the measures proposed by this invention, more particularly when step-by-step system exchanges are converted to full co-ordinate working.

For the purpose of defining the scope of the invention, by co-ordinate switching equipment is meant cross-bar or cross point switching equipment which employs a number of co-ordinate switching arrays each affording selective interconnection between two sets of multiple conductor connections of which the connections of one set are considered as being arranged co-ordinately in relation to the connection of the other set so as to define between them a number of multiple conductor cross-points each provided with multiple switching means operable for connecting the conductors of one connection at the cross-point to corresponding conductors of the other connection at the cross-point. The co-ordinate switching array may be constituted by a cross-bar switch of well-known form, or, alternatively, it may be constituted by an array of relays or electronic switching devices. When relays are employed, each cross-point of an array may be equipped with an individual relay having contact pairs corresponding in number to the number of conductors in each multiple conductor connection. If electronic switching devices are used then each cross-point will be equipped with an appropriate number of such devices determined on the same basis. The present invention, however, especially, but not exclusively, contemplates the provision of so-called reed relays at the cross-points of the co-ordinate switching arrays.

According to the present invention, an automatic telephone exchange comprising step-by-step switching equipment also includes co-ordinate switching equipment serving some of the lines connected to the exchange and having access to, and itself being accessible from, selecting switches of said step-by-step switching equipment for the purpose of setting up calls from and to these particular ones of the lines connected to the exchange.

The co-ordinate switching equipment may comprise primary and secondary switching stages which are arranged to be selectively operated in the setting up of both incoming and outgoing calls to the lines served by the co-ordinate switching equipment, together with an additional secondary switching stage arranged to be operated for dealing with incoming calls to these lines for affording selective access to the first-mentioned secondary switching stage from selecting switches of the step-by-step switching equipment. Conveniently, the primary switching stage may be constituted by an "A" rank of switching arrays, the first mentioned secondary switching stage may be constituted by "B" and "C" ranks of switching arrays, and the additional secondary switching stage may be constituted by a "D" rank of switching arrays. Access connections from selecting switches of the step-by-step switching equipment to the additional secondary switching stage may include transmission bridge circuits for supervising incoming calls to the lines served by the co-ordinate switching equipment. To achieve economy of switches, it is preferred to arrange that the switches of the additional secondary switching stage are interconnected to afford restricted access only to switches of the first-mentioned secondary switching stage from outlets of the appropriate selecting switches of the step-by-step switching equipment.

In carrying out the invention, the co-ordinate switching equipment preferably comprises at least one unit of switching equipment embodying switching arrays pertaining to the primary and first-mentioned secondary switching stages, the or each such unit having associated with it switching arrays pertaining to the additional secondary switching stage together with associated control equipment as will hereinafter be referred to. Such a unit of co-ordinate switching equipment, together with its associated control equipment, may, on the one hand, have seen substituted for step-by-step switching equipment, or, on the other hand, such unit of equipment may comprise an exchange extension unit. As regards the former arrangement (i.e. exchange conversion unit), the first-mentioned secondary switching stage of the co-ordinate switching unit will be afforded direct access to normally-provided selectors of the step-by-step switching equipment in the setting up of outgoing calls from lines served by such unit, whereas with the latter arrangement (i.e. exchange extension unit) the corresponding secondary switching stage will have access to normally-provided selectors of the step-by-step switching equipment through additional selecting switches which it will be necessary to provide when introducing the co-ordinate exchange extension unit.

The or each unit of co-ordinate switching equipment may comprise a plurality of sub-units among which the switching arrays of the unit that pertain to the first-mentioned secondary switching stage are divided, the organisation of the unit as a whole being such that each switching array of the unit that is an array pertaining to the primary switching stage has access to a switching array, pertaining to the first-mentioned secondary switching stage, of each of the plurality of sub-units, but the switching arrays, pertaining to the first-mentioned secondary switching stage, of the respective sub-units are mutually separate. The division among the sub-units of the switching arrays of a unit that pertain to the first-mentioned secondary switching stage serves to define different sections of the co-ordinate switching equipment, and thereby not only enables the advantages of exchange sectionalisation in accordance with the inventions forming the subject of U.S. Patent Nos. 3,272,924 and 3,214,524 to be realised immediately by the provision of suitable route choice equipment associated with the unit, but also facilitates the eventual introduction of common control equipment for the co-ordinate switching equipment so that the exchange, upon being converted to full co-ordinate equipment, can readily be organised for operating in accordance with the invention that forms the subject of the last-mentioned co-pending application.

In the case of step-by-step system director exchanges under conversion, the secondary switching stage of the unit of co-ordinate switching equipment may be afforded selective access to 1st code selectors of the step-by-step system in the setting up of outgoing calls from lines served by the unit, while access to this secondary switching stage may be afforded to 1st numerical selectors of the step-by-step system by selective operation of switches of the additional secondary switching stage in the setting up of incoming calls to lines served by the unit.

When extending director exchanges or non-director exchanges with one or more units of co-ordinate switching equipment as has been referred to, additional 1st selectors will be introduced between switches of the secondary switching stage of the co-ordinate unit or units, as the case may be, and 1st selectors (e.g. 1st code or 1st numerical selectors) of the step-by-step system.

In the case of exchange extension units of co-ordinate switching equipment, these may conveniently be arranged in two parts serving, respectively, for dealing with outgoing and incoming calls to lines served by the unit as a whole.

Each of the units of co-ordinate switching equipment may have associated with it registers, a line scanning arrangement and other control equipment, in addition to the additional secondary switching stage, route choice equipment and transmission bridge circuits referred to above.

For the purpose of affording a better understanding of the present invention an examplary embodiment of it will now be described with reference to the accompanying drawings, in which.

Figure 1A:
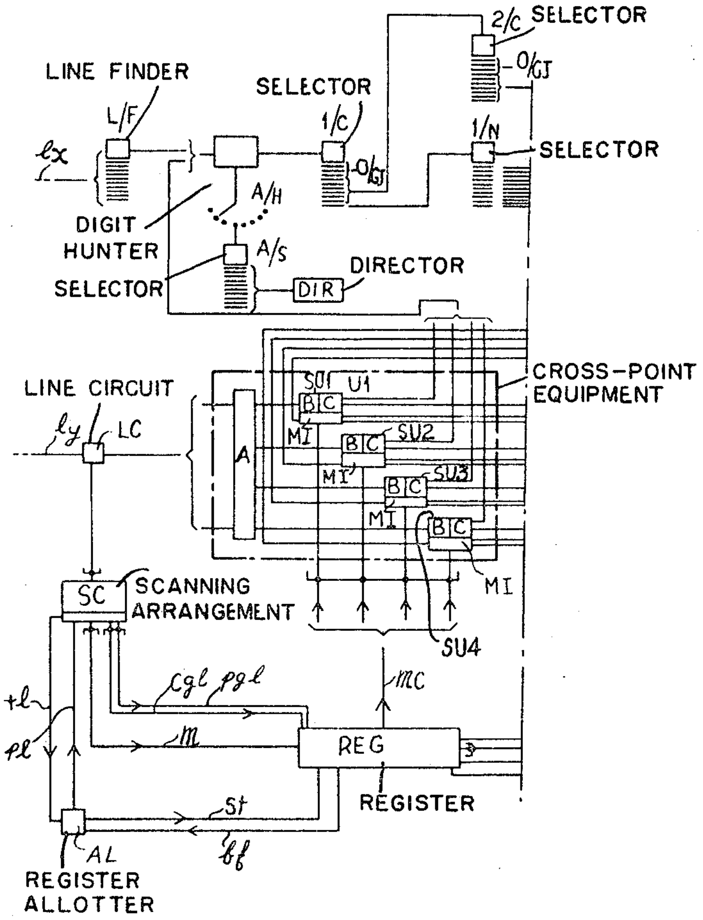
FIGS. 1A and 1B are portions of a schematic diagram showing parts of a director exchange which, having been originally equipped with step-by-step switching equipment, is under conversion to cross-bar or cross-point working and has undergone partial conversion in accordance with the invention.

In referring to FIGS. 1A and 1B of the drawings, consideration will first be given to the step-by-step switching equipment of the exchange. In this connection, a proportion of the totality of subscribers' lines served by the exchange, which proportion of lines includes a subscriber's line 1$x$, are multipled over the banks of line finders, one of which is designated L/F. These line finders are arranged to search for calling lines and to connect such lines to free 1st code selectors, as for instance the 1st code selector 1/C. Consequent upon a calling line being connected to a 1st code selector, an "A"-digit hunter, such as the hunter A/H, searches over its bank contacts for a free "A"-digit selector (e.g. selector A/S). When a free "A"-digit selector is found, it is seized and returns dial tone to the calling line thus signifying that dialling into the exchange may be commenced. The first dialled digit steps the "A"-digit selector to a particular level dependent upon the initial letter of an exchange code being dialled by the calling subscriber. The "A"-digit selector accordingly affords the calling line selective access to a group of directors, whereupon the selector then hunts for and seizes the first free director, such as the director DIR, in the selected group of directors. The usual "B-C" switch of the selected director will be stepped in response to the 2nd and 3rd code digits (i.e. the "B" and "C" digits) dialled by the calling subscriber. Thereafter, the numerical digits of the called subscriber's number are dialled into the director, and at this juncture the director provides a routing code translation for the call and sender equipment, transmits one or more trains of impulses, in accordance with this translation, to one or more code selectors via the "A"-digit hunter. As the case may be, the one such train of impulses, or the first of such trains of impulses, sets a 1st code selector, such as the selector 1/C. Subsequent such trains of impulses may be transmitted and utilised for setting a 2nd code selector (e.g. the selector 2/C) and a 3rd code selector (e.g. the selector 3/C) to afford access to an outgoing junction O/GJ or, alternatively, direct access to an outgoing junction O/GJ may be afforded by 1st or 2nd code selectors. In all cases involving an outgoing junction, the numerical digits stored by the director are finally transmitted over the selected outgoing junction. In the case of a local call between two subscribers served by the step-by-step switching equipment, the call is routed to the called subscriber through 1st and 2nd numerical selectors, such as the selectors 1/N and 2/N, and a final selector, such as the selector F/S. Incoming calls from distant exchanges to subscribers served by the step-by-step switching equipment of the exchange under consideration will, in accordance with the usual practice, be routed from the incoming junctions, such as I/CJ concerned through 1st and 2nd numerical selectors, such as the selectors 1/N/J and point exchange will be organised in accordance with U.S.

As mentioned previously, the exchange shown in FIG. 1 of the drawings has already undergone partial conversion to cross-bar or cross-point working. In this regard, it may conveniently be assumed for the purposes of description that the exchange under consideration serves 10,000 subscribers in all and that after an initial phase of conversion from step-to-step to cross-bar or cross-point working the step-by-step switching equipment serves 9,000 subscribers, while the remaining 1,000 subscribers connected to the exchange are served by an initial installation of cross-bar or cross-point switching equipment. As will become apparent, further installations of such cross-bar or cross-point switching equipment accompanied by the necessary control and associated apparatus can be introduced into the exchange in replacement of step-by-step switching equipment until such time as conversion to cross-bar or cross-point working is complete. Upon such completion, it is contemplated that the cross-bar or cross-point exchange will be organised in accordance with U.S. Patent 3,214,524.

Before describing the organisation of the cross-bar or cross-point switching equipment and its mode of operation, it may here be mentioned that the initial installation of such equipment for replacing stey-by-step switching equipment may be accommodated in any convenient position pending the removal of redundant step-by-step switching equipment from the exchange building. The compactness and relatively small size of the initial installation of cross-bar or cross-point equipment enables it to be accommodated without serious difficulties, the position being significantly improved by reason of the fact that common control equipment for serving the totality of cross-point switching equipment upon full conversion of the exchange to cross-bar or cross-point working will not normally be introduced in the early phases of exchange conversion. As regards accommodation of the installation, it is especially contemplated that redundant manual-board rooms may be used for the purpose. Another contemplated arrangement for providing accommodation involves the transfer of a group of subscribers served by the step-by-step switching equipment to a distant exchange, having surplus switching capacity at the time, until such time as the cross-bar or cross-point installation has been substituted for step-by-step equipment and is ready to be brought into service. Yet another arrangement envisaged involves the replacement of conventional directors by directors of the type employing magnetic core translators, the replacement serving to achieve a saving of space so as to afford accommodation for the cross-bar or cross-point equipment. If there is insufficient accommodation within the exchange building itself, an outside caravan may alternatively be used for temporarily housing the initial installation.

Immediately the initial installation of cross-bar or cross-point switching equipment is brought into service or as soon as the subscribers formerly served by step-by-step switching equipment at the exchange are transferred to a distant exchange as aforesaid, that step-by-step switching equipment which is rendered redundant by such transfer of subscribers' lines can be recovered to provide vacant acommodation in the exchange building for receiving another installation of cross-bar or cross-point equipment in substitution of still further step-by-step switching equipment. As the second and subsequent installations of cross-bar or cross-point equipment are introduced into the exchange and brought into service, the total quantity of step-by-step switching equipment, and thus the number of subscribers' lines served by such equipment, will be progressively reduced until the exchange is finally converted to full cross-bar or cross-point working. As will readily be appreciated, at no stage in the conversion of the exchange to cross-bar or cross-point working need the service to subscribers be interrupted, since in all cases the cross-bar or cross-point equipment can be installed and brought into service before the redundant step-by-step switching equipment is removed from the apparatus room of the exchange building. It is envisaged that the previously mentioned common control equipment for the cross-bar or cross-point switching equipment will be installed in the exchange just prior to the conversion of the exchange to full cross-bar or cross-point working or at some other stage in the conversion when the total quantity of cross-bar or cross-point switching equipment installed, or the increased revenue that could be expected to result from additional facilities provided by such common control equipment, justifies the expense of providing such common control. It will be appreciated therefore that by the time it is required to introduce the common control equipment, the saving in space realised by the substitution of several relatively small installations of cross-bar or cross-point equipment will be more than sufficient to accommodate the control equipment. When the common control equipment has been installed, various items of control equipment serving the respective installations of cross-bar or cross-point equipment, as will hereinafter be described, can be removed from service.

Figure 1B:
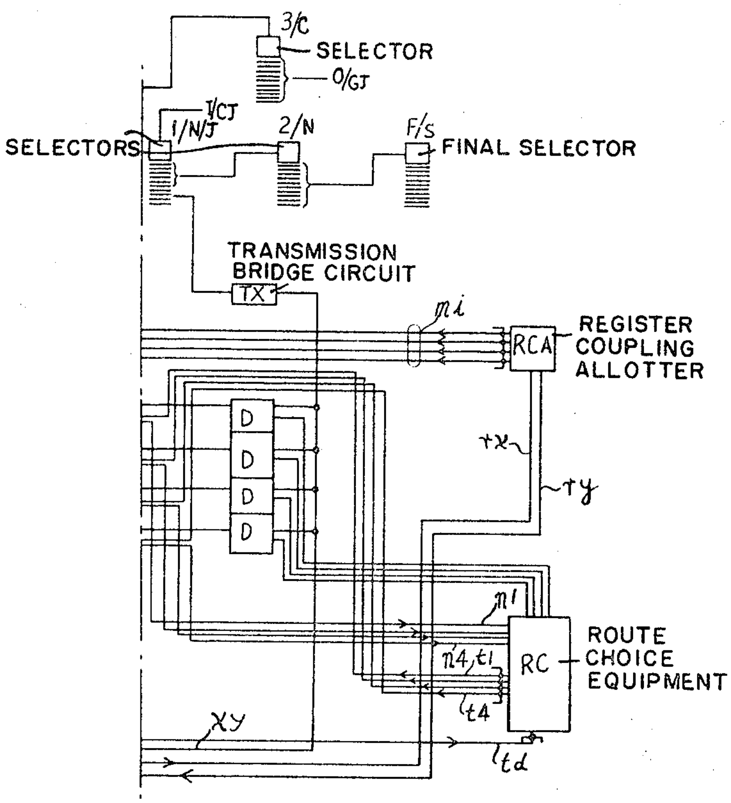

FIGS. 1A and 1B shows an initial installation of cross-bar or cross-point equipment, and in accordance with the concept of the present invention this switching equipment is afforded access to, and is itself accessible from, existing step-by-step switches for the setting up of calls through the exchange. Before describing the organisation and operation of such switching equipment, it may here be mentioned that it is preferred to employ cross-point switches of the kind in which the cross-points at the intersections of the coordinately arranged sets of connections, as hereinbefore described, are constituted by the physical contacts of so-called reed relays. For convenience in description, the switches of the cross-bar or cross-point switching equipment will be referred to simply as cross-point switches or arrays and the coordinately arranged connections will be termed verticals and horizontals.

Reverting now to FIGS. 1A and 1B of the drawings, it will be recollected that the cross-point switching equipment forming the initial installation may conveniently be assumed to serve 1,000 subscribers' lines, one of which is indicated at *ly*. Each of these lines has associated with it a line circuit, as for example the line circuit LC associated with the subsriber's line *ly*, from which the condition of the associated line can be ascertained in the manner to be described. In this connection it is especially contemplated that line circuits arranged in accordance with co-pending U.S. patent application Ser. No. 212,508, now Patent No. 3,231,681, will be employed in order to provide discrimination between normal calling and so-called permanent-calling (PG) conditions on the associated lines. Briefly, such discrimination is achieved by providing in the line circuit a so-called two-step cut-off relay which has, in addition to fully operated and fully released conditions, a partially operated condition which it is caused to assume under permanent-calling conditions to provide a potential indicating such condition. The circuit arrangement described in the last-mentioned U.S. application provides for the normal calling and permanent-calling or permanent-loop conditions to be signalled to registers in accordance with the condition of the two-step cut-off relay. The subscribers' lines may be scanned for the looped condition (which condition comprises the calling and permanent-calling conditions) by a line scanning arrangement which is capable of providing an identification of any loop line. This scanning arrangement may be arranged and adapted to operate in the manner described with reference to FIG. 2 of the last-mentioned U.S. application or any other suitable scanning arrangement may be employed. The line scaning arrangement, which is indicated at SC in FIGS. 1A and 1B, upon detecting a looped (e.g. calling) line, requests the services of a register to deal with the expected call by extending a signal to a register allotter, such as the register allotter AL, over a request lead *rl*. This register allotter allocates a previoulsy selected free register, such as the register REG, to deal with the expected call, and after the register has been seized over a lead *sr* and the seized register busied to the allotter over a busy/free lead *bf* the allotter returns a signal to the line scanning arrangement SC over a lead *pl*. The signal on the lead *pl* causes the scanning arrangement to extend markings identifying the calling subscriber's number to the register over leads represented by the single lead *m* in FIGS. 1A and 1B. The normal calling or permanent-calling signals will be applied to all the registers from the scanning arrangement over the leads *cgl* and *pgl*, respectively. According to the last-mentioned U.S. application, markings which together identify looped lines' numbers, are arranged to be transmitted simultaneously to the registers from code identification elements of the scanning arrangement and such markings will be accepted by the particular register taken into use for dealing with the expected call. It will be appreciated, however, that different arrangements may be employed for identifying looped lines' numbers to registers. For instance, in the present embodiment, as will hereinafter be apparent, the identities of looped lines are transmitted to the registers by successive one-out-of-ten markings from the scanning arrangement. These successive one-out-of-ten markings correspond to the 2nd, 3rd and 4th numerical digits of the looped line's number.

Before considering the operation of registers in the setting up of calls through the exchange, it is necessary to consider the arrangement of cross-point switching and marker/interrogator equipment. This switching and marker/interrogator equipment is shown within the chain line block U1 which represents one unit of cross-point equipment which will be retained in its entirety when the exchange is completely converted to full cross-point working. It may here be mentioned that the line circuits and the scanning arrangement discussed above will also be retained. One or more of such units of cross-point equipment may be added to the exchange in respect of each installation of cross-point switching equipment as hereinbefore referred to. Such units of equipment are arranged in accordance with U.S. Patent No. 3,214,524, that is to say, the switching equipment comprises a plurality of "A" switching arrays which afford selective access between subscribers' lines and "B" switching arrays of respective sub-units of switching equipment designated SU1 to SU4 located in mutually separate exchange sections. As will be seen from FIG. 1, each of these sub-units of equipment includes "C" switching arrays which afford selective access between the "B" switching arrays of the same sub-unit of equipment and 1st code selectors of the system and between these "B" switches and "D" switching arrays appertaining to the respective exchange sections (or sub-units). These "D" switching arrays serve, among other things, to provide selective access between some of the "C" arrays in each of the exchange sections (or sub-units) and each outlet on an appropriate level of 1st numerical selectors for incoming calls to subscribers served by the cross-point equipment. It may here be mentioned that had the number of subscribers served by the cross-point switching equipment been in excess of 1,000, then the "C" arrays of each exchange section would have been accessible from two or more levels of the 1st numerical selectors for incoming calls, the particular level conveniently indicating which group of 1,000 subscribers includes the called subscriber. For further information concerning exchange sectionalisation and the advantages ensuing from it, reference may be had to the U.S. Patents 3,272,924 and 3,214,524. Although, in the present example taken, the cross-point equipment is divided into four sections (or sub-units), it will be understood that any other number of sections could alternatively be provided.

From FIGS. 1A and 1B, it will be appreciated that for incoming calls the "A," "B" and "C" arrays act as 2nd numerical and final selectors, as a consequence of which it is necessary to introduce transmission bridge circuits, such as the circuit TX conveniently taking the form of a relay set, which provide for the call supervision normally provided for by the transmission bridges in final selector circuits in the case of the step-by-step system. It should be understood, however, that these transmission bridge circuits, such as the circuit TX, will be dispensed with when the exchange is converted to full cross-point working with common control since supervision of calls will then be effected from the link paths provided in accordance with the two U.S. patents just mentioned.

As regards outgoing calls from subscribers served by the unit of cross-point equipment U1, these will be routed by the directors of the step-by-step system through 1st code selectors and one or more subsequent step-by-step switching ranks. In the case of such outgoing calls where the called lines are also served by the cross-point switching equipment, the directors will route the calls to the incoming side of the cross-point equipment via the appropriate level of the 1st numerical selectors.

It is now convenient to describe briefly the operation of the unit of cross-point equipment U1. Considering first of all the mode of operation for outgoing calls, it will be remembered that one of the registers, such as the register REG, associated with the cross-point equipment will be taken into use by a calling subscriber and has identified to it from the line scanning arrangement the identity of the calling subscriber's number. The register will normally have transmitted to it only the 2nd, 3rd and 4th numerical digits of the calling subscriber's number. Consequently, in the case where the number of subscribers served by the cross-point switching unit exceeds 1,000, the 1st numerical digit will need to be identified. This may be achieved by arranging that the registers are divided into groups, each of which serves a group of 1,000 lines. In this way, the group identity of the particular register taken into use by the line scanning arrangement for dealing with an outgoing call identifies the 1st numerical (thousand) digit of the calling line. As described previously, these numerical digits are transmitted to the register in the form of successive one-out-of-ten markings over a group of leads represented by the lead *m*. The register stores these digits in digital stores, and consequent upon its receipt of the 4th numerical digit, which will be the last digit to be received from the scanning arrangement, the register requests coupling of itself to marker/interrogators MI associated with the "B" and "C" arrays of each exchange section (or sub-unit). This request for coupling comprises a signal extended to a register coupling allotter RCA over a request lead *rx*. The allotter RCA responds by returning a couple signal over lead *ry* to cause the register which requested coupling to be coupled to groups of marking leads represented by the lead *mc*. At the same time, the free marker/interrogators MI of the respective exchange sections are caused to be coupled to these groups of marking leads *mc* in response to couple signals applied to a group of leads *mi*. The digital stores of the register extend markings to corresponding digital stores in the marker/interrogators MI over the groups of leads *mc*, after which the register is uncoupled from the marker/interrogators, which then proceed, in the manner to be described with reference to FIGS. 2 to 7, to interrogate the cross-point switching arrays, responsively to interrogate pulses applied over groups of leads represented by the single leads *t*1 to *t*4, to obtain information for comparator and route choice equipment RC concerning the available free routes through the exchange sections for the connection of the calling line to 1st code selectors. This information, upon being received from the various sections over groups of leads represented by the single leads *n*1 to *n*4, is used by the comparator and route choice equipment in choosing a route for the call through a particular section of the exchange on the basis of the information transmitted to it concerning the traffic conditions in the respective sections. The comparator and route choice equipment RC accordingly selects the particular section through which the call is to be routed and the particular "C" array inlet (i.e. vertical) is identified by the route choice equipment to the marker/interrogator MI of the particular section selected. As a consequence, the marker in question sets up the connection between the "C" array inlet identified by the route choice equipment and the calling line in accordance with the information identifying the 2nd, 3rd, and 4th numerical digits stored in the digital stores of the marker/interrogator.

When the calling line has been coupled up to the 1st code selector, the setting up of the call then proceeds under the control of a director such as DIR, as will be apparent from the description already given.

Turning now to the mode of operation for incoming calls to subscribers served by the unit of cross-point switching equipment U1, the first digit received, in respect of such a call, by the 1st numerical selector taken into use for the call will step the 1st numerical selector to an appropriate level for affording access to the cross-point switching equipment. The 1st numerical selector hunts over the level in question for a free "D" array inlet and its associated register, such as the register REG. This free register is seized by extending over a lead *xy* a signal which causes the register to extend a busy signal to the register allotter AL over the busy/free lead *bf*. In addition, a digital-impulse-counting device in the register taken into use is coupled for receiving (in turn) the 2nd, 3rd and 4th numerical digits of the called line's number. These numerical digits are stored in the respective digital stores of the register under control of a digital marking distributor, and consequent upon the receipt of the 4th numerical digit the register requests coupling to the marker/interrogators. As previously mentioned, for dealing with incoming calls to the cross-point equipment the "D" switches render a number of the "C" arrays in each exchange section accessible to each of the outlets on the appropriate level of the 1st numerical selectors. However, it is unnecessary and uneconomic to provide access from each of the "D" switching arrays to all of the "C" arrays, and for this reason the "D" switching arrays are interconnected with the "C" switching arrays according to predetermined patterns of switches to afford the required availability of the "C" arrays to all of the 1st numerical selector outlets concerned. This causes the "D" switches to be of what may be termed different types, the term "type" being used in this regard in the sense that a "D" switch of one type may for example have access to "C" switches 10 and 1 in each section, while a "D" switch of another type may for example have access to "C" switches 2 and 3 in each section, and so on.

The type of "D" switch having one of its inlets connected to the 1st numerical selector outlet (calling) to which the register is coupled will be indicated to the comparator and route choice equipment RC over one of a number of leads, such as the lead *td*, at the time when the register is coupled to the marker/interrogators, as will hereinafter be described. Such indication serves for signifying to the comparator and route choice equipment RC the particular "C" arrays of each exchange section that are capable of being afforded access to the 1st numerical selector outlet (calling) by "D" switches of the type in question.

When the register, such as the register REG, is coupled up to the marker/interrogators, the information stored in the register (i.e. the 2nd, 3rd and 4th numerical digits of the called subscriber's number) is passed from the register into digital stores in all free marker/interrogators.

The marker/interrogators interrogate the switching arrays for the purpose of determining available routes through the respective exchange sections on the basis of the information passed to them from the register and also from the comparator and route choice equipment RC. In this connection, the comparator and route choice equipment RC transmits an interrogate signal to the several marker/interrogators, as for instance over the groups of leads *t*1 to *t*4, so that only the "C" array inlets connected to outlets of "D" switches capable of routing the incoming call are interrogated. Information resulting from such interrogation and enabling a route choice to be made for the incoming call is transmitted to the comparator and route choice equipment over the groups of leads *n*1 to *n*4. The comparator and route choice equipment RC accordingly chooses a particular "D" outlet thereby making a selection of a particular exchange section for routing the call to the called subscriber. The identity of the "D" outlet selected is signified to the exchange section in question and appropriate cross-points of the switching arrays (i.e. "D," "C," "B" and "A") are set in turn under control of sequence control means, with the connection towards the called subscriber being held by positive battery extended through the "D" switch. The called line is tested and the condition (busy or free) of the line is signalled to the transmission bridge in the connection between the 1st numerical selector through which the incoming call is routed and the particular "D" switch being utilised. Finally, the register, marker/interrogator and other equipment employed in the setting up of the call will be released, whereupon the cross-points in the connection will be held from the transmission bridge, such as the bridge TX.

Figure 8:
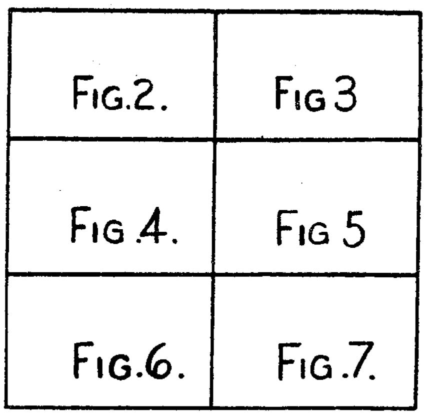
FIG. 8 shows the organisation of FIGS. 2 to 7.

Turning now to FIGS. 2 to 7 of the drawings, these figures, when organised in the manner indicated in FIG. 8, show parts of the cross-point switching system of FIG. 1 in more detail.

Figure 2A:
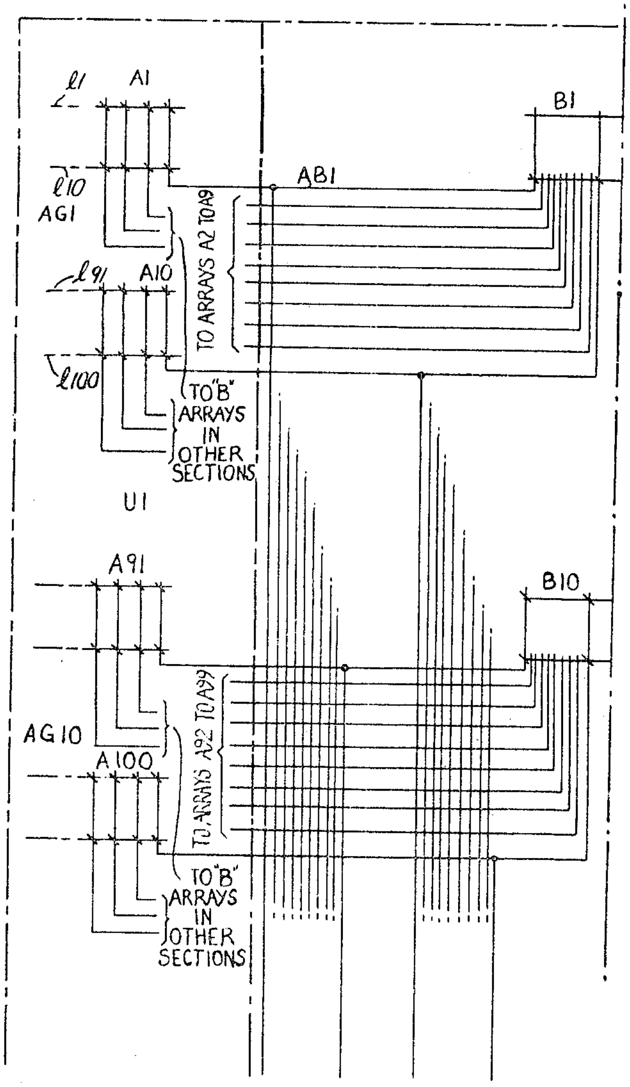
FIGS. 2 to 7 show a part of the cross-point switching equipment and associated control apparatus of the exchange of FIG. 1 in greater detail.
Figure 2B:
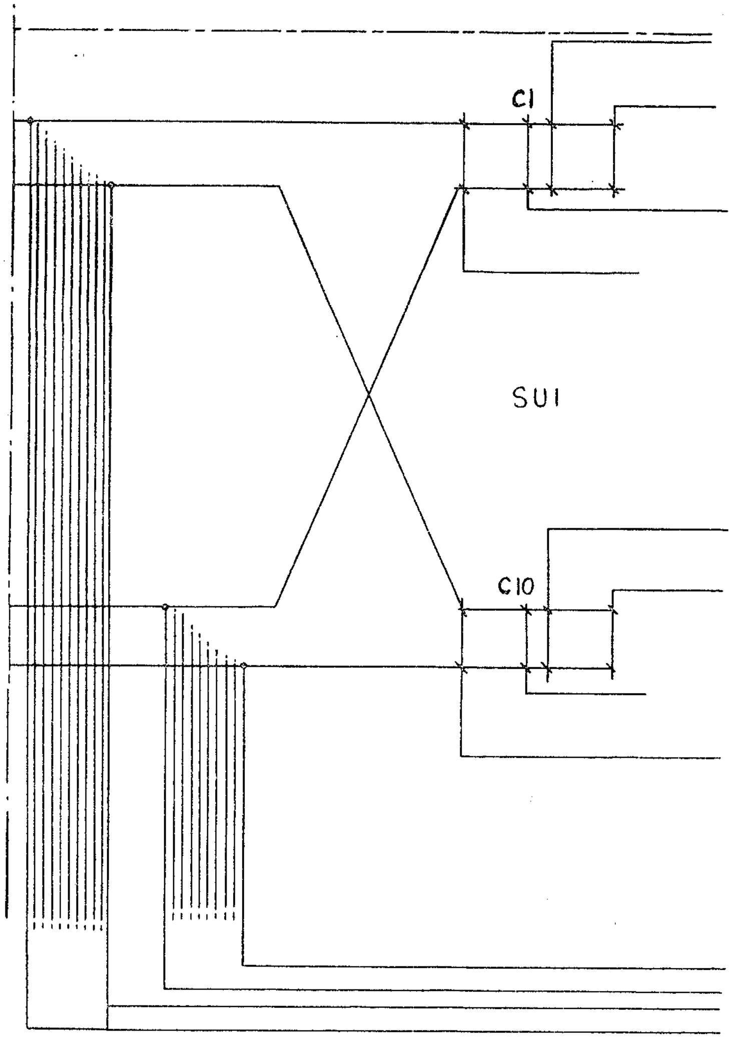
Figure 3A:
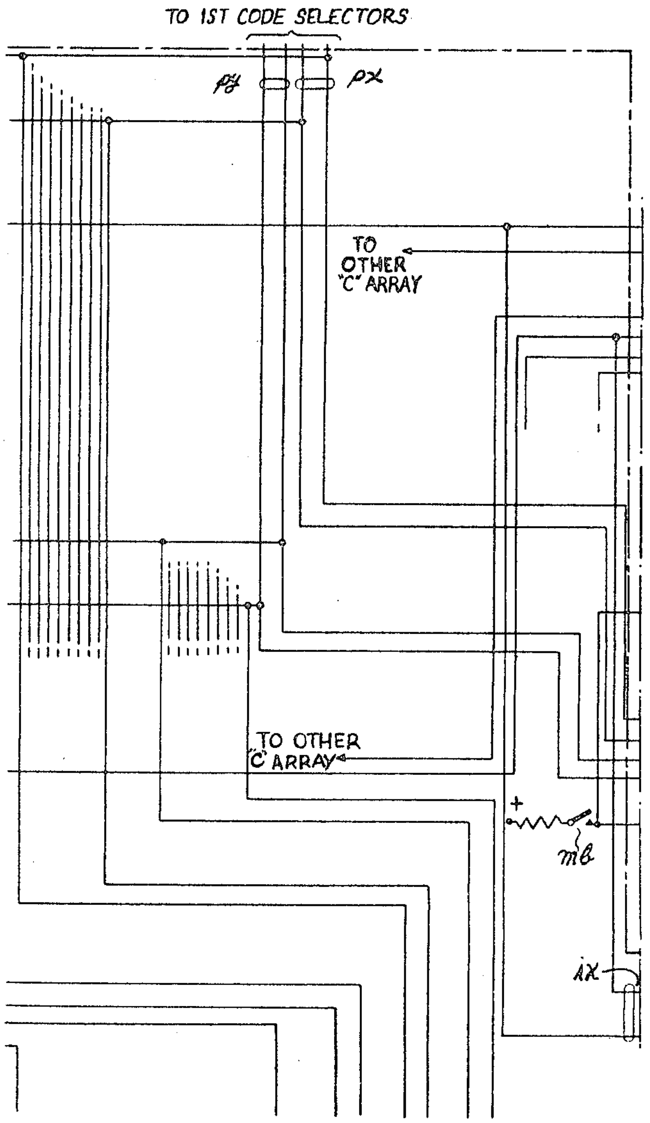
Figure 3B:
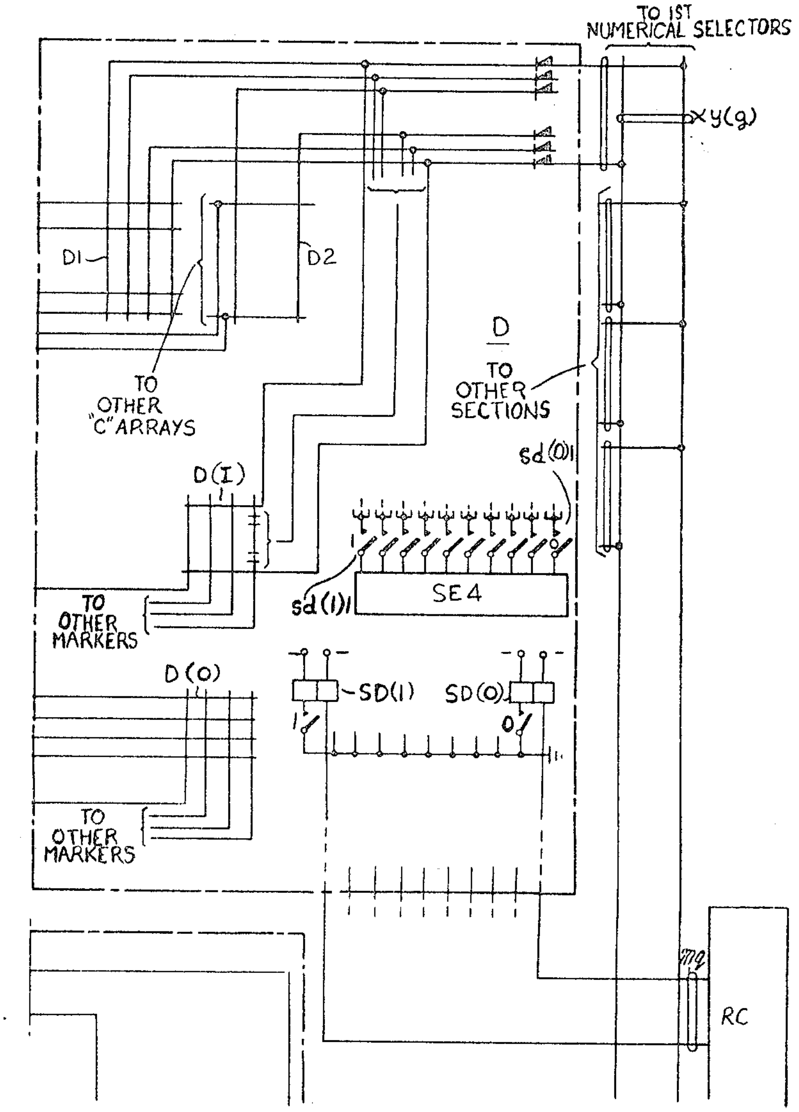
Figure 4A:
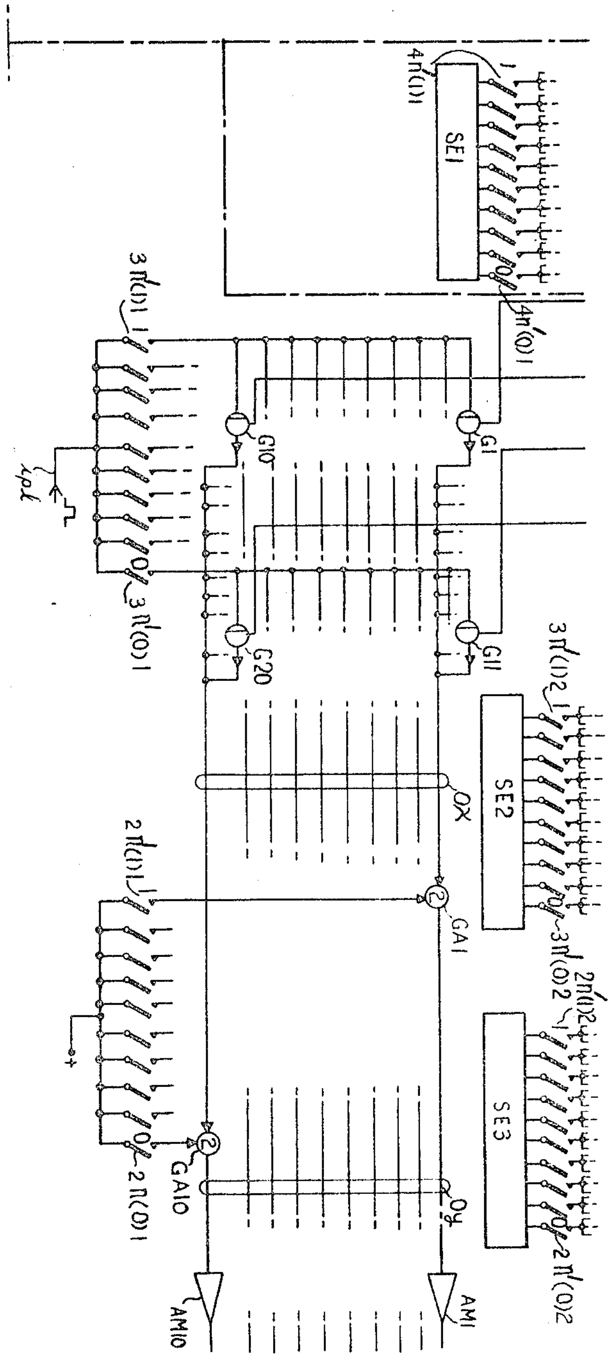
Figure 4B:
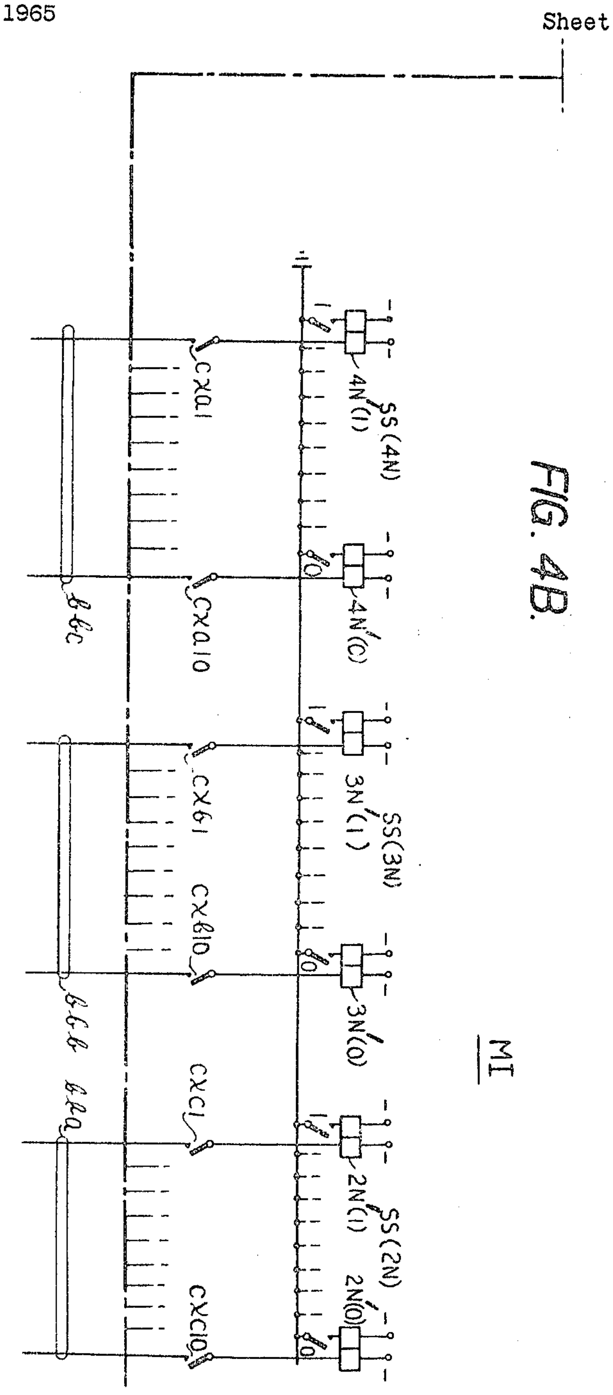
Figure 5A:
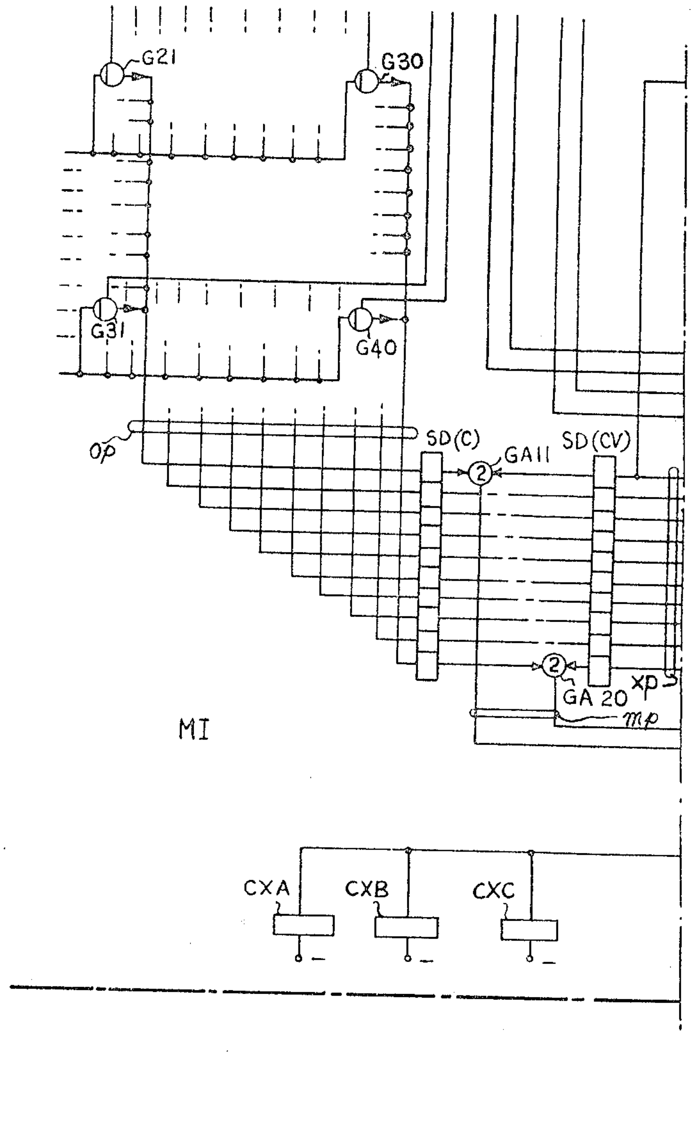
Figure 5B:
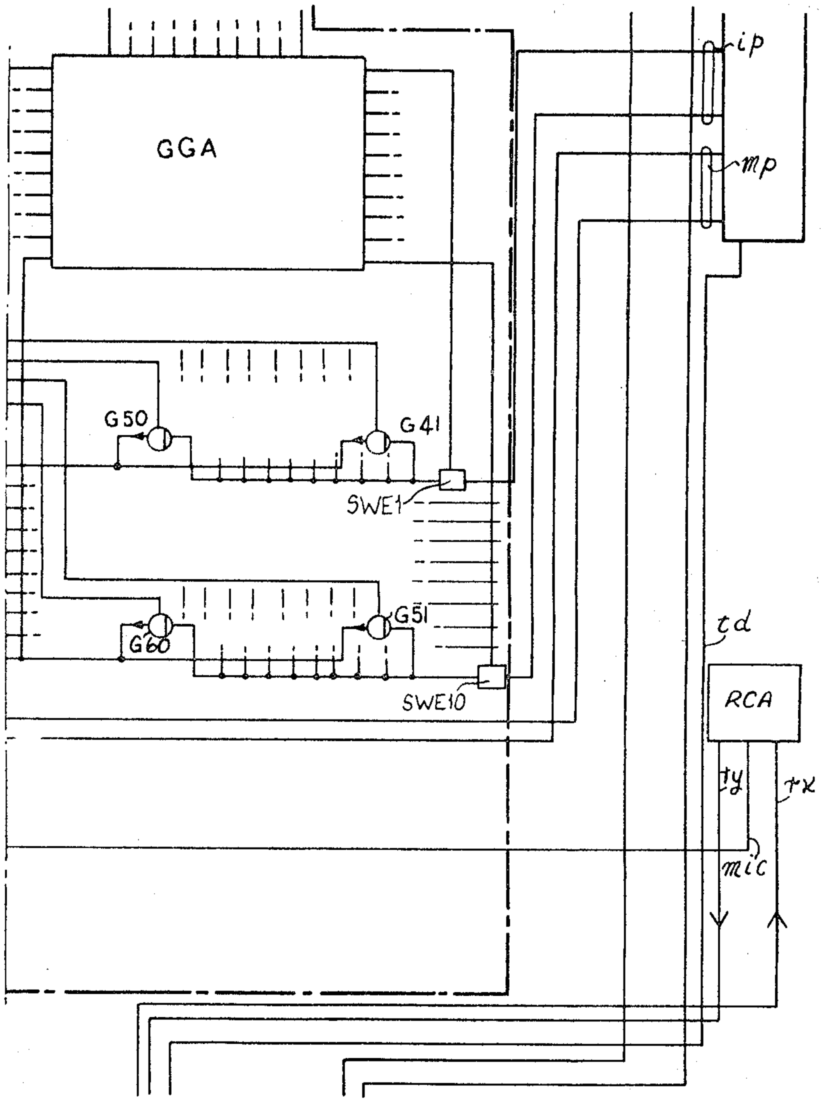
Figure 6A:
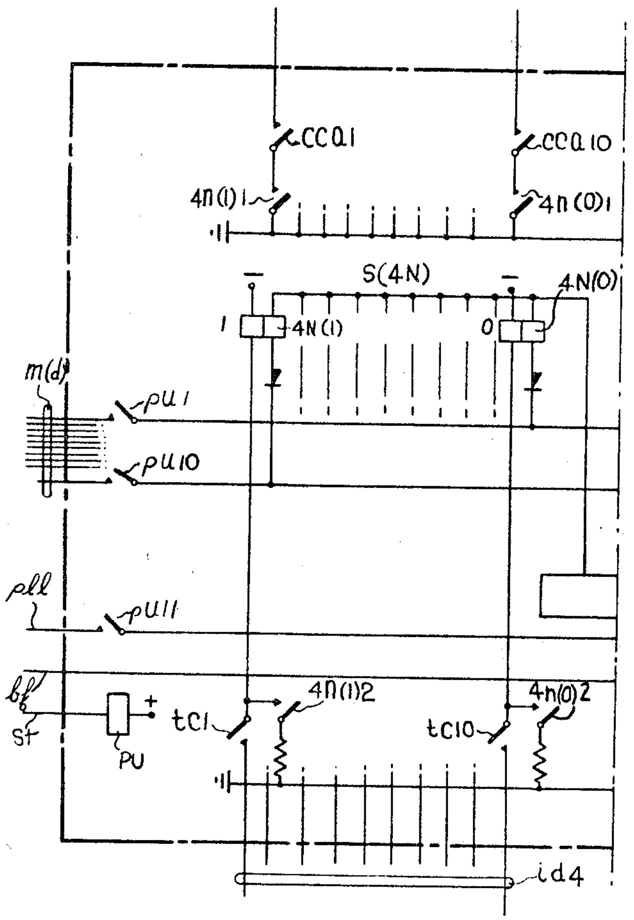
Figure 6B:
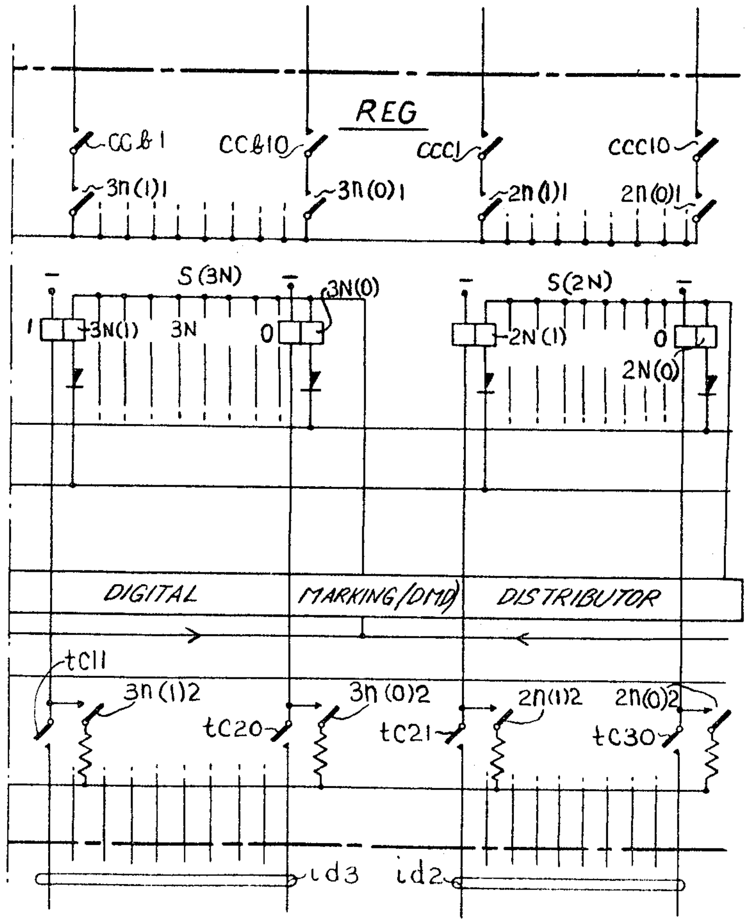
Figure 7A:
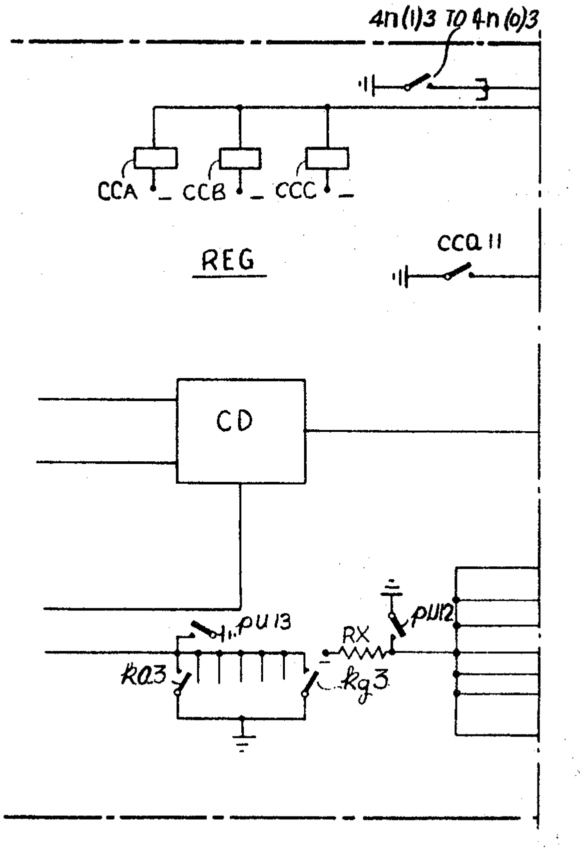
Figure 7B:
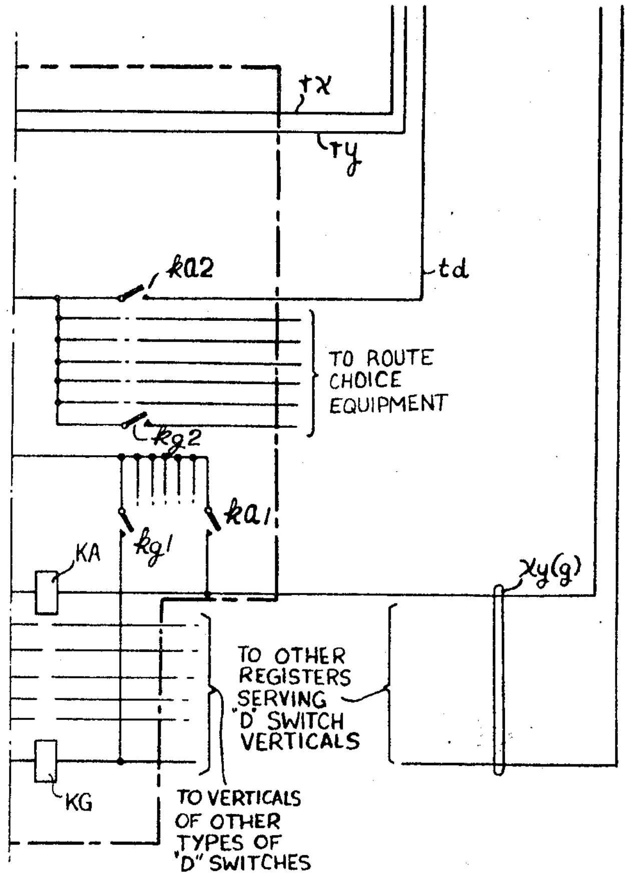

By referring firstly to FIG. 2, it will be seen that typical "A" switching arrays for the entire unit of equipment U1 have been shown, whereas "B" and "C" arrays of only one particular sub-unit, namely sub-unit SU1, have been included so as not to overburden the diagram.

The "A" arrays are divided into ten groups designated AG1 to AG10, each of which comprises ten "A" arrays, as for example the arrays A1 to A10 of the group AG1. Each of the "A" arrays serves ten subscribers' lines, as for instance the lines *l*1 to *l*10 served by the array A1, while each group of ten arrays, such as the group A1 to A10, serves a subscriber's line group comprising 100 lines. Still referring to FIG. 2, it will be appreciated that the subscribers' lines of each line group can be afforded access to a particular "B" array in each of the exchange sections. For instance, the subscribers' lines *l*1 to *l*100 can be connected via the "A" array group AG1 to the "B" array B1 in sub-unit SU1 and to "B" arrays corresponding to the array B1 in the other sub-units (or exchange sections) which are not shown. In the present example, each of the sub-units (or exchange sections) has ten "B" arrays, such as the arrays B1 to B10 of the sub-unit SU1. Each of the "B" arrays of each section, such as the array B1, has access to all of the "C" arrays in the same sub-unit, but such "B" arrays have no direct access to the "C" arrays in other sub-units (or exchange sections). Considering FIGS. 2 and 3 together, certain of the verticals of the "C" arrays are connected (to serve for the setting up of outgoing calls, as already described with reference to FIGS. 1A and 1B) to 1st code selectors, such as that 1st code selector 1/C (FIG. 1), by respective groups of leads, as for example the groups of leads *px* and *py* in respect of the arrays C1 and C10 respectively. These groups of leads *px* and *py* are extended to what will be called a "D" outgoing selection switch D(0). By appropriate operation of this outgoing selection switch D(0), a particular vertical of a particular "C" array is marked in the setting up of the calling side of an outgoing call as will be described later.

Other verticals of the "C" arrays of the sub-unit SU1 are connected (to serve for the setting up of the called side of incoming calls) to "D" switching arrays, as for example the arrays D1 and D2, which provide selective access between the aforesaid verticals and the leads of a group of leads $xy(g)$ extending to respective outlets on the appropriate level, assigned to incoming calls to the cross-point equipment, of the 1st numerical selectors.

The group of leads $xy(g)$ extends to registers, including the register REG (FIGS. 6 and 7), each of which is connected to the verticals of "D" switches in the several exchange sections. The connections to the registers from the "D" switches include register coupling relays, as for instance the register coupling relays KA to KG associated with the register REG. In this regard, it will be seen for example that the "D" switches represented diagrammatically at D1 and D2, and appertaining to the sub-unit SU1, have their verticals connected to different leads of the group of leads $xy(g)$ and these different leads will accordingly be connected to a register through different register coupling relays, such as the relays KA and KG for example. An intimation of the type of "D" switch taking a register into use, constituting an intimation of the particular "C" arrays which can be afforded access to the 1st numerical selector outlet concerned, is arranged to be transmitted to the comparator and route choice equipment RC over a group of leads, including the lead *td*.

Having described in some detail the organisation of the cross-point switching arrays, other parts of the equipment will now be described, firstly in relation to the operation in the setting up of outgoing calls.

From the description relating to FIGS. 1A and 1B, it will be recalled that for an outgoing call a free register is seized by the register allotter AL (FIGS. 1A and 1B) in response to a request from the line scanning arrangement SC (FIGS. 1A and 1B). By referring now to FIGS. 6 and 7 of the drawings, which together show the register REG, it will be observed that seizure of the register is in fact achieved by the operation of a relay PU by a negative signal received over the "register seize" lead *sr*. Consequent upon the operation of the relay PU, the register REG is busied to the allotter AL by contacts *pu*13 (FIG. 7) applying earth potential to the busy/free lead *bf*. Contacts *pu*12, in closing, prevent the seizure of the register REG for incoming calls. Relay contacts *pu*1 to *pu*10, in closing, couple up a group of ten digital marking leads $m(d)$ (represented by the single lead *m* in FIGS. 1A and 1B) to parallel connected digital stores S(2N), S(3N), S(4N) which are arranged for storing the identities of the 2nd (hundreds), 3rd (tens) and 4th (units) numerical digits of the calling subscriber's number. These digital stores are arranged to be opened sequentially under the control of a digital marking distributor DMD, which is connected for being pulsed from the line scanning arrangement SC (FIGS. 1A and 1B) over pulse lead *p*11 extended into the register REG over contacts *pu*11. The digital stores just referred to conveniently comprise reed relays, as for instance the relays 4N(1) to 4N(0) constituting the digital store S(4N).

The line scanning arrangement, having had the register REG coupled to it, delivers a pulse to the digital marking distributor DMD, which accordingly opens the digital store S(2N) by the priming of the relays 2N(1) to 2N(0). The scanning arrangement extends a one-out-of-ten marking, corresponding to the 2nd numerical (hundreds) digit of the calling subscriber's number, to the group of marking leads $m(d)$ to bring about the operation of the appropriate relay in the digital store S(2N). The digital marking distributor DMD, upon receiving a further pulse from the line scanning arrangement, closes the store S(2N) and opens the store S(3N) so that a further one-out-of-ten marking, corresponding to the 3rd numerical (tens) digit of the calling subscriber's number, applied to the marking leads $m(d)$ brings about the operation of the appropriate relay in the digital store S(3N). Finally, in response to a further pulse received by the digital marking distributor DMD, the store S(3N) is closed and the store S(4N) opened, and the appropriate relay of store S(4N) is operated consequent upon the application to the marking leads $m(d)$ of a one-out-of-ten marking corresponding to the 4th numerical (units) digit of the calling subscriber's number. The register REG thus has stored within it the 2nd, 3rd and 4th numerical digits of the calling subscriber's number. Consequent upon the operation of the relay in the digital store S(4N), contacts thereof (e.g. contacts $4n(1)3$ or $4n(0)3$) apply earth potential to the request lead *rx* to request coupling of the register REG to marker/interrogators of the several exchange sections. This request is directed to the register coupling allotter RCA, which responds by returning positive potential to the register over lead *ry* to effect operation of coupling relays, as for example the relays CCA, CCB and CCC, appertaining to the respective digital stores in the register REG. Contemporaneously, the register coupling allotter RCA applies positive potential over leads, such as the lead *mic*, to marker/interrogators, such as the marker/interrogator MI shown in FIGS. 4 and 5, so as to bring about the operation of coupling relays, as for example the coupling relays CXA, CXB and CXC associated with respective digital stores in the marker/interrogator MI. The digital stores just referred to are designated SS(2N), SS(3N) and SS(4N), and conveniently comprise groups of reed relays, such as the group of ten relays 4N′(1) to 4N′(0) constituting the digital store SS(4N). The stores of the marker/interrogator correspond to digital stores in the register REG. When coupling relays CCA, CCB and CCC (FIG. 7) operate, one-out-of-ten markings corresponding to the 2nd, 3rd and 4th numerical digits of the calling substriber's number are extended to the marker/interrogators, including the marker/interrogator MI of FIGS. 4 and 5, over respective groups of leads *bba*, *bbb* and *bbc*. These groups of leads are connected to all of the marker/interrogators in the several exchange sections, and are arranged to be extended to the respective digital stores of all free marker/interrogators in response to the operation of the coupling relays as for example relays CXA, CXB and CXC in the marker/interrogator MI, so that the one-out-of-ten markings on the groups of leads in question effect operation of an appropriate relay in each of the digital stores, such as the stores SS(2N), SS(3N) and SS(4N).

The marker/interrogators taken into use now have stored within them the identity of the calling subscriber's number (assuming that the cross-point switching unit only serves 1,000 subscribers in all so that it is unnecessary to identify the 1st numerical, i.e. thousands, digit of the calling line's number), and the next step in setting up the calling side of a connection to the first code selectors consists in interrogating the "B" and "C" switching arrays for the purpose of determining available routes through the respective exchange sections. The interrogation of the arrays may conveniently be carried out as follows:

It will be remembered from the description of FIG. 2 that the "A" arrays of the cross-point switching unit are divided into groups of ten, such as the group AG1, and, moreover, that each group of ten arrays serves a line group of 100 lines. Furthermore, the line group is afforded access to a "B" array in each of the exchange sections. For example, the subscribers' lines *l*1 to *l*100 constituting one such line group have access to the "B" array B1 of the sub-unit SU1 as well as to corresponding "B" arrays in the other exchange sections. The calling subscriber's 3rd numerical (tens) digit stored in the digital store SS(3N) of the marker/interrogator MI in effect identifies a particular vertical of each of the "B" arrays since the verticals of each of these arrays appertains to a particular tens digit. As will be seen from FIG. 2, groups of corresponding verticals of the "B" arrays B1 to B10 are connected to the bias inputs of respective groups of pulse-plus-bias gates, such as the group of gates G1 to G10 or the group of gates G11 to G20. The pulse inputs of the gates of the respective groups are commoned together as shown and are capable of being connected to an interrogate pulse lead *ipl* over contacts of the digital store relays 3N′(1) to 3N′(0). Corresponding gates of the respective groups of gates have their output connections connected in common to the leads of a group of output leads *ox*. Thus, the outputs of gates G1 and G11 are connected in common to one lead of the group *ox*, while the outputs from the gates G10 and G20 are connected to another lead of this group. Since one of the contacts $3n'(1)1$ to $3n'(0)1$ will be operated, an interrogate pulse will be applied from the lead *ipl* to the commoned pulse inputs of the relevant group of gates. If, as regards each of the "B" arrays B1 to B10, the particular vertical identified by the stored 3rd numerical (tens) digit is in a free condition, then the relevant gate appertaining to the "B" array will be biased open so that the interrogate pulse can pass through it to the corresponding lead of the group of output leads *ox*. Consequently, markings signifying those arrays of the "B" arrays B1 to B10 that have the requisite vertical thereof in a free condition, will be applied to the group of leads *ox*.

The digit stored in the store SS(2N), which digit is the 2nd numerical (hundreds) digit of the calling subscriber's number, identifies the particular "B" array having access to the calling line. To enable it to be detected whether the particular "B" array in question has an appropriate vertical, as signified by the tens digit, in the free condition, the group of leads *ox* and the markings on these leads are extended to 1st inputs of "AND" gates GA1 to GA10 while a one-out-of-ten marking corresponding to the 2nd numerical (hundreds) digit of the calling line is applied to the 2nd inputs of the gates GA1 to GA10. As a consequence a one-out-of-ten marking will be applied to a group of leads *oy* if the appropriate vertical of the requisite "B" array is in the free condition. This one-out-of-ten marking thus identifies the particular "B" array having access to the calling line. The marking signal on one of the leads *oy* will be amplified by an appropriate amplifier of the amplifiers AM1 to AM10 associated with the respective leads of the group *oy*. To enable it to be determined which, if any, of the "B–C" connections between the particular "B" array marked on the group of leads *oy* and the relevant "C" arrays are in the free condition, the "B–C" connections referred to are connected to the bias inputs of respective pulse-plus-bias gates of a group of such gates, as for example the group of gates G21 to G30 where the B1 array is the "B" array in question, or the group of gates G31 to Q40 if the marked "B" array is the array B10. The output connections of corresponding gates of respective groups, such as the output connections of the gates G21 and G31, or G30 and G40, are connected in common to the respective leads of a group of leads *op*. These leads appertain to the respective "C" arrays accessible from each of the "B" arrays. The pulse input connections to the groups of gates are connected in common to the respective amplifiers associated with the respective leads of the group of leads *oy*. It will be recalled that one of the leads *oy* has a pulse marking thereon. Such pulse marking will consequently be applied to the commoned pulse inputs of one group of gates, as for example the group of gates G21 to G30. Those gates of the group in question that have their bias inputs connected to free "B–C" connections will be opened and thus pass the pulse applied to their pulse inputs on to leads of the group *op*. The pattern of output pulses on the leads *op* represents the "B–C" connections ("C" arrays) that are available for setting up a connection to the calling line. This pattern of pulses is registered in a storage device SD(C).

Before the calling side of the connection can be set up, it is also necessary to ascertain the condition of connections extending from the "C" arrays to the 1st code selectors. This is achieved by the comparator and route choice equipment RC applying an interrogate pulse to a group of leads *ip* which are connected, respectively, through switching elements SWE1 to SWE10 to be referred to later, to the command pulse inputs of groups of pulse-plus-bias gates, such as the groups of gates G41 to G50 and G51 to G60. The bias inputs of the gates of each of these groups, such as the group of gates G41 to G50, are connected to the connections between one of the "C" arrays, such as the "C" array C1, and 1st code selectors. The pulse output connections of the respective groups of gates are connected in common to leads of a group of leads *xp*. From a consideration of the gating circuit arrangement, it will be apparent that the leads of the group *xp* appertain to respective "C" arrays of the arrays C1 to C10. If at least one of the connections between a particular "C" array and 1st code selectors is free, then the interrogate pulse received from the comparator and route choice equipment RC will pass through at least one of the gates of the group of such gates associated with the "C" array in question. Consequently, the group of leads *xp* will bear pulse markings representing a pattern of "C" arrays having free 1st code selector interconnections. This pulse pattern is registered in a device SD(CV).

Outputs from the respective devices SD(C) and SD(CV), which outputs identify those "C" arrays that have suitable free "B–C" connections and those "C" arrays having free interconnections with 1st code selectors, respectively, are applied to the respective 1st and 2nd inputs of "AND" gates of a group of gates GA11 to GA20. These "AND" gates are arranged to provide outputs on leads of a group of leads *mp* if appropriate inputs are derived from the respective devices SD(C) and SD(CV). Consequently, markings on the leads *mp* which extend to the comparator and route choice equipment RC serve for identifying the particular "C" arrays of the exchange section that can be used in the setting up of the calling side of the call. Marker/interrogators appertaining to the other exchange sections similarly feed markings into the comparator and route choice equipment RC for identifying suitable free routes through those exchange sections for setting up the calling side of the call. On the basis of the information fed to it, the comparator and route choice equipment RC chooses an advantageous route for the call. So-called call packing with a smoothing of traffic over the exchange sections may be carried out in a manner somewhat similar to that described in U.S. Patents 3,272,924 and 3,214,524. Having chosen a route for the call, the route choice equipment RC may be arranged to operate a relay in the selected exchange section so that a positive marking battery will be applied over contacts of such relay, as for example contacts *mb* (FIG. 3), to a vertical of the switch D(0). The appropriate horizontal of this switch D(0) may be marked as appropriate from the route choice equipment RC, with the consequence that the appropriate cross-point of this switch is operated to extend the marking to the particular "C" switch inlet that pertains to the chosen route. The connection to the calling line can now be set up by the marker bringing about the operation of cross-points of the "C," "B," and "A" arrays in accordance with the operated relays in the digital stores SS(2N), SS(3N) and SS(4N). It is arranged that the appropriate cross-points of the "C," "B" and "A" arrays are operated sequentially by sequence control means represented by the blocks SE1 to SE3. The calling side of the call having been set up, the setting up of the call then proceeds under the control of a director such as D1R (FIG. 1), as will be apparent from the description already given.

As regards an incoming call to the cross-point equipment, a positive calling potential will be applied to one of the group of leads *xy*(*g*) (FIG. 3) that is found to be free by the particular 1st numerical selector, such as 1/N or 1/N/J (FIG. 1), that is taken into use for the call. The particular lead of the group *xy*(*g*) selected is connected to the inlets of "D" switches, such as the switch D1 say. This lead is also connected to a free (since the lead has tested free) register, as for example the register REG, through a register coupling relay appropriate to the type of the "D" switches connected to said lead.

Let it be assumed that the register REG is the one concerned, and that the appropriate coupling relay, which operates to the positive potential applied to the calling lead, is the relay KA. The current flowing through the winding of this relay produces across a resistor RX a voltage drop that suffices to prevent the other coupling relays associated with the register REG from operating, and in this way the register REG is effectively busied (to further incoming calls) on other leads of the group *xy*(*g*) that are connected to the register REG via different coupling relays, such as the coupling relay KG. When the coupling relay KA operates, a register busy signal is applied to the lead *bf* extending to the register allotter AL (FIGS. 1A and 1B) by the closure of contacts of the coupling relay (i.e. contacts *ka*3). Further contacts *ka*2 of the operated register coupling relay extend the calling lead of the group *xy*(*g*) to the digital-impulse-counting device CD. This device receives the 2nd, 3rd and 4th numerical digits of the called subscriber's number as trains of impulses over the appropriate lead of the group of leads *xy*(*g*), and these digits are registered in the device CD and subsequently fed in sequence to the digital stores S(2N), S(3N) and S(4N) of the register REG in the form of one-out-of-ten markings in the same way as the line scanning arrangement SC (FIG. 1) fed corresponding markings to these stores in the case of an outgoing call. In the present case, however, the digital marking distributor DMD is arranged to be pulsed from the counting device CD for the sequential opening of the register stores. The procedure for coupling up the register REG to marker/interrogators is the same as that already described for an outgoing call. Additionally, however, contacts of one of the register coupling relays, as for example the contacts *cca*11 of coupling relay CCA, in operating, when the register REG is coupled to the marker/interrogators, extend a signal to the route choice equipment RC over one of a number of leads, as for example the lead *td*, according to the particular register coupling relay (e.g. relay KA) operated in order to signify to the route choice equipment RC the particular type of "D" switch that is connected to the calling lead of the leads *xy*(*g*). Interrogation of the "B" and "C" arrays takes place as for outgoing calls up to the registration in the device SD(C) of a pattern of "C" arrays suitable for affording access to the called subscriber, but it will be appreciated that, in view of the limited availability of the "C" arrays, as for example the arrays C1 to C10 (FIG. 2), to particular 1st numerical selector outlets (calling), only a proportion of those arrays that have their identities registered in the device SD(C) can in fact be utilised for the call. The "C" arrays which are suitable, that is to say the arrays which are afforded access to the calling 1st numerical selector outlet, will in effect be identified by the "D" switch type marking applied to the route choice equipment RC from the register REG. Accordingly, the route choice equipment RC applies an interrogate pulse to selected ones of a group of leads, which may conveniently be considered as the group of leads *ip*. This interrogate pulse is fed over the leads in question into a gating circuit arrangement represented by the block GGA, being in the case of an incoming call diverted from the gates such as G41 to G50 and G51 to G60 by the prior operation of switching elements SWE1 to SWE10. By means of this gating circuit arrangement, only the verticals of those "C" arrays which are afforded access to the calling lead of the group *xy*(*g*) by "D" switches are interrogated. This may be achieved by providing groups of leads, such as the group of leads *ix*, which extend from the relevant verticals of the respective "C" arrays into the gating circuit arrangement GGA and arranging that markings on these leads serve for biasing open pulse-plus-bias gates of the gating arrangement GGA to indicate which of these verticals is in a free condition. The pulse inputs to these gates will be derived from the comparator and route choice equipment RC as aforesaid in the form of the interrogate pulse and the gates of the arrangement are so organised that outputs from the pulse-plus-bias gates are applied to leads of the group *xp* appertaining to those "C" array verticals which are both free and suitable for setting up the called side of the connection.

The pulse output markings on the group of leads *xp* are registered in the device SD(CV). The outputs from the devices SD(C) and SD(CV) are applied to the "AND" gates GA11 to GA20. Markings on the group of leads *mp* will again signify to the route choice equipment RC the particular "C" arrys of the exchange section that can be used in the setting up of the called side of the call. Corresponding markings will be obtained from each of the exchange sections, and on the basis of this information the route choice equipment RC will proceed to choose a route for the called side of the connection. The route choice equipment RC, when it makes its choice of route, identifies to the chosen section the particular "D" switch to be used in the connection. In the selected exchange section, a positive marking battery is applied from the marker/interrogator over relay contacts, as for example contacts *mb* in the marker/interrogator MI. This marking battery is extended to one of the verticals of a "D" inlet selection switch D(I), which is arranged to be operated in accordance with information obtained from the route choice equipment RC identifying the "D" switch inlet (or vertical) connected to the calling lead of the group *xy*(*g*). Switch D(I) extends the marking battery to the appropriate "D" switch inlet (or vertical). The "D" switch outlet or "C" switch inlet involved in the connection to be set up is identified from the route choice equipment RC by operation of the appropriate one of relays SD(1) to SD(0) over the group of leads *mq*. The cross-points of the respective "D," "C," "B" and "A" switching arrays are then operated in appropriate sequence in accordance with the operation of relays in the group of relays SD(1) to SD(0) and the relays constituting the digital stores in the marker/interrogator in order to set up the connection to the called line. Testing of the called line is carried out and the busy/free condition of the line is signalled to the transmission bridge circuit, such as the circuit TX in FIG. 1, that is included in the connection between the "D" switch inlet and the calling outlet of the 1st numerical selector of the step-by-step switching equipment.

The register coupling relay (e.g. relay KA), the register REG, the marker/interrogator and the "D" inlet selection switch D(I) are finally released, leaving the cross-points involved in the connection held operated from the transmission bridge circuit, such as the circuit TX (FIG. 1).

It has previously been mentioned that the exchange shown in the drawings comprises a single unit of cross-point switching equipment U1, together with its associated "D" switches, registers, etc. Consequently, the question of routing calls from one such unit to another does not arise. However, if the initial phase of conversion undergone by the exchange had entailed the introduction of a plurality of such switching units together with their associated equipment, or when a second phase of conversion introduces further units of cross-point switching equipment into the exchange, then calls between subscribers served by different units of cross-point switching equipment may be routed by the directors of the step-by-step switching equipment through the 1st code selectors (e.g. 1st code selector 1/C in FIGS. 1A and 1B) and 1st numerical selectors (e.g. 1st numerical selector 1/N in FIGS. 1A and 1B).

To enable junction working to be provided by the exchange upon being converted to full cross-point working, that is to say when the code selectors and 1st numerical selectors of the step-by-step system are no longer available for affording access to and from outgoing and incoming junctions, respectively, it is convenient during all phases of conevrsion to take into account as far as accommodation the subsequent need for equipping the exchange, in respect of each unit of cross-point switching equipment provided for local calls, with a further unit of switching equipment and an associated scanning arrangement. This further switching equipment will deal with junction calls, with the associated line scanning arrangement being connected for scanning incoming junction lines connected to the exchange. The "C" arrays of the junction cross-point switching equipment will be connected to link paths when the "D" switches associated with these units are dispensed with upon full conversion of the exchange. The registers, such as the register REG, will also be rendered redundant since their function will be performed by registers of the type standard for full cross-point working and by the common control equipment serving all of the units of cross-point switching equipment.

In the description which has been given with reference to FIGS. 2 to 7, it was assumed, since the register REG passed the particular markings received from the counting device CD to the marker/interrogators, that the called line involved in an incoming call to the cross-point equipment was an ordinary subscriber's line. However, it will be realised that called lines involved in incoming calls to the cross-point equipment could comprise special lines (e.g. stores S(4N), S(3N) and S2N)), extend such special lines it may be arranged that the registers, such as the register REG (FIGS. 6 and 7), after having the identities of called lines stored within their digital stores (e.g. stores S(4N), S(3N) and S(2N), extend such stored called line identities to a translator (not shown) which serves for providing a code translation in respect of special called lines. By referring to FIGS. 6 and 7, it will be seen that the identities of called lines' numbers may be extended into the translator over groups of leads *id*2, *id*3 and *id*4 responsively to the operation of translator coupling relays (not shown) having contacts *tc*1 to *tc*30. The translator, which may be coupled to the register under the control of an allotter arranged for affording access to the translator from the registers one at a time by the operation of appropriate translator coupling relays, conveniently comprises a so-called code-point translator, that is to say any translator of conventional form employing code-point gating circuits for converting received code digital markings identifying a called line into translated (changed number) digital markings appropriate for routnig a call to the required line. Code-point translators are described and referred to in U.S. Patent 3,272,924. To ascertain whether a called line having its identity stored in the register REG say, is a P.B.X. line and, if so, to identify the number of the first free line of the particular P.B.X. group concerned, the digital markings on the groups of leads *id*2, *id*3 and *id*4 are applied to appropriate groups of the four groups of ten leads *c* shown at the top of FIGS. 1A and 1B of the specification accompanying the last-mentioned application. The remaining group of ten leads *c*, however, appertains to the 1st numerical (thousands) digit of the called line's number, and consequently this group of leads will need to have the identity of the 1st numerical digit of the called line's number identified to it from the register in all cases where the number of subscribers served by the totality of cross-point switching equipment exceeds one thousand. Testing and identification of a free line of a P.B.X. group in the case where the translator recognises the called line's identity as being that of a P.B.X. line may be carried out in the manner fully described in the last-mentioned specification. The digital stores in the register having been restored to normal, translated digit markings in the form of one-out-of-ten positive markings are transmitted back over the groups of leads *id*2, *id*3 and *id*4 so as to operate these stores in accordance with the translated called line's number. Thereafter, the register may be coupled to the marker/interrogators and the interrogation of the cross-point switching arrays of the respective exchange sections carried out in respect of the translated called line's number.

Although the foregoing specific description has been restricted to the conversion of a director exchange employing step-by-step equipment to cross-point working, it will be understood that non-director step-by-step exchanges may similarly be converted to cross-point working, but with the exchange equipment organised so that (i) outgoing calls from the cross-point switching equipment are routed through 1st selectors of the step-by-step system instead of through 1st code selectors, and so that (ii) incoming calls to the cross-point switching equipment are routed via appropriate levels of such 1st selectors instead of via levels of 1st numerical selectors.

Reference has previously been made to the fact that the invention is applicable to the extension of existing step-by-step exchanges, as distinct from conversion, by the introduction into the exchange of units of cross-point switching equipment together with their associated equipment (viz. registers, line scanning arangements, etc.). On this subject of exchange extension, it may be emphasised that the relatively small size and compactness of the cross-point switching equipment as compared with step-by-step equipment enables existing step-by-step exchanges to be advantageously extended by providing considerably more additional lines than could be afforded by further step-by-step equipment.

In extending existing step-by-step exchanges by cross-point equipment, it is contemplated that the organisation of the cross-point switching equipment will be similar to that already described for exchange conversion, but with the principal difference that outgoing calls from the cross-point switching equipment are routed to 1st selectors of the step-by-step system (in the case of non-director exchanges) or 1st code selectors (in the case of director exchanges) through additional 1st selectors having their outlets multiplied over the banks of 1st or 1st code selectors of the existing step-by-step system.

The cross-point equipment may, if desired, comprise separate outgoing and incoming units so that the outgoing unit is connected to the additional 1st selectors just referred to while the incoming unit is connected via a transmission bridge circuit to the outlets of 1st or 1st numerical selectors, as the case may be. Such outgoing and incoming units will have associated with them line scanning arrangements, markers/interrogators, registers, etc. as required.

It is conceivable that the additional 1st selectors required for extending step-by-step exchanges by cross-point equipment could be furnished in the form of special units of cross-point switching equipment. However, step-by-step switching equipment being rendered redundant by conversion of step-by-step exchanges to cross-point working as hereinbefore described, it can be expected that step-by-step switches will be readily available for use as additional 1st selectors in extended exchanges.

In extending non-director exchanges, an exchange route translator may be provided so that all originating calls, that is to say all the calls originating from subscribers served by the cross-point switching equipment and the step-by-step equipment are routed to a coupling arrangement interposed between line finders and 1st selectors of the step-by-step system, and between "C" arrays of the cross-point switching equipment and 1st selectors of the step-by-step system as well as the additional 1st selectors referred to above. The coupling arrangement routes calls via registers to the route translator. The registers extend to the exchange route translator the digits of the called subscriber dialled by the calling subscriber, and re-routing information is then passed back to the registers where it is converted into trains of impulses for setting sebsequent selectors of the step-by-step system and/or cross-points in the cross-point extension unit or units, as the case may be.

From the foregoing it will be appreciated that the present invention, by introducing cross-point switching equipment into step-by-step systems and by relying, at least during early phases of exchange conversion, upon the step-by-step system for special facilities to subscribers served by the cross-point equipment thereby obviating the need for common control equipment for the cross-point equipment, enables step-by-step exchanges to be extended or converted to more up-to-date exchanges while effectively increasing the line capacity of the exchanges. In this regard, it has been found that with non-director exchanges converted to full cross-point working the totality of cross-point switching equipment only occupies one half of the floor space previously occupied by step-by-step equipment. Consequently, the line capacity of the exchange has been considerably increased. By conversion of director exchanges even greater economy of space will be achieved. For instance, it is expected that the line capacity of 10,000 line director step-by-step exchanges may be increased to 30,000 by converting to cross-point working in accordance with the present invention.

What we claim is:

1. An automatic telephone exchange comprising step-by-step and co-ordinate switching equipment, said co-ordinate switching equipment comprising primary and secondary switching stages which are selectively operable in the setting up of both incoming and outgoing calls to lines served by said co-ordinate switching equipment and an additional secondary switching stage operable in respect of incoming calls to said lines for affording selective access to said first mentioned secondary switching stage from selecting switches of the step-by-step switching equipment.

2. An automatic telephone exchange according to claim 1 wherein the primary switching stage of the co-ordinate switching equipment is constituted by a first rank of switching arrays, the first-mentioned secondary switching stage is constituted by second and third ranks of switching arrays, and the additional secondary switching stage is constituted by a fourth rank of switching arrays.

3. An automatic telephone exchange according to claim 1 wherein access connections from selecting switches of the step-by-step switching equipment to said additional secondary switching stage include transmission bridge circuits for supervising incoming calls to the lines served by the co-ordinate switching equipment.

4. An automatic telephone exchange according to claim 1 wherein the co-ordinate switching equipment comprises at least one unit of switching equipment embodying switching arrays pertaining to the primary and first-mentioned secondary switching stages, the or each such unit having associated with it switching arrays pertaining to the additional secondary switching stage together with associated control equipment.

5. An automatic telephone exchange according to claim 4 wherein the or each said unit comprises a plurality of sub-units among which the switching arrays of the unit that pertain to the first-mentioned secondary switching stage are divided, the organisation of the unit as a whole being such that each switching array of the unit that is an array pertaining to the primary switching stage has access to a switching array, pertaining to the first-mentioned secondary switching stage, of each of the plurality of sub-units, but the switching arrays, pertaining to the first-mentioned secondary switching stage, of the respective sub-units are mutually separate, and the division among the sub-units of the switching arrays of the unit that pertain to the first-mentioned secondary switching stage serving to define different sections for the purposes of route choice by route choice equipment associated with the unit.

References Cited

UNITED STATES PATENTS 3,342,942 9/1967 Miller et al.

WILLIAM C. COOPER, *Primary Examiner.*